(12) United States Patent
Chen et al.

(10) Patent No.: US 9,182,628 B2
(45) Date of Patent: Nov. 10, 2015

(54) TWO DIMENSION/THREE DIMENSION SWITCHABLE LIQUID CRYSTAL LENS ASSEMBLY

(71) Applicant: SHENZHEN CHINA STAR OPTOELECTRONICS TECHNOLOGY CO., LTD., Shenzhen, Guangdong (CN)

(72) Inventors: Chih-Wen Chen, Shenzhen (CN); Chia-Chiang Hsiao, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 73 days.

(21) Appl. No.: 13/697,352

(22) PCT Filed: Sep. 27, 2012

(86) PCT No.: PCT/CN2012/082140
§ 371 (c)(1),
(2) Date: Nov. 10, 2012

(87) PCT Pub. No.: WO2014/047829
PCT Pub. Date: Apr. 3, 2014

(65) Prior Publication Data
US 2014/0085553 A1    Mar. 27, 2014

(30) Foreign Application Priority Data
Sep. 25, 2012    (CN) .......................... 2012 1 0359413

(51) Int. Cl.
| | | |
|---|---|---|
| *G02F 1/13* | (2006.01) | |
| *G02F 1/1335* | (2006.01) | |
| *G02F 1/1343* | (2006.01) | |
| *G02F 1/29* | (2006.01) | |
| *G02B 27/22* | (2006.01) | |

(52) U.S. Cl.
CPC .......... *G02F 1/133526* (2013.01); *G02B 27/22* (2013.01); *G02F 1/134309* (2013.01); *G02F 1/29* (2013.01); *G02F 2001/294* (2013.01)

(58) Field of Classification Search
CPC ............ G02F 1/1339; G02F 2001/294; G02F 1/1335; G02F 1/1343; G02B 27/2214; G02B 3/14; G02B 27/22; G02B 27/225; G02B 21/22; G02B 27/2228; H04N 13/0402
USPC ..................................... 349/141, 200
See application file for complete search history.

(56) References Cited

U.S. PATENT DOCUMENTS

| | | | |
|---|---|---|---|
| 2013/0002970 A1* | 1/2013 | Baek et al. ......................... 349/5 |
| 2013/0222716 A1* | 8/2013 | Uehara et al. ................... 349/15 |
| 2014/0002759 A1 | 1/2014 | Chen et al. | |

FOREIGN PATENT DOCUMENTS

CN    102062985 A    5/2011

*Primary Examiner* — Edward Glick
*Assistant Examiner* — David Chung

(57) ABSTRACT

The present invention discloses a 2D/3D switchable liquid crystal lens assembly. The liquid crystal lens assembly from an emitting surface to an incident surface sequentially includes a plurality of adjacently arranged elongated convex lenses, a first transparent substrate, a second transparent substrate, a plurality of electrodes disposed on the second transparent substrate, and a liquid crystal layer sandwiched between the first and second transparent substrates. The plurality of electrodes are used for controlling an alignment of liquid crystal molecules inside the liquid crystal layer so as to adjust a refractive index of the liquid crystal molecules inside the liquid crystal layer corresponding to at least one pixel. The refractive index progressively increase or progressively decrease from a center toward both sides to control a propagation direction of incident light and guide the passed incident light to one of the convex lenses.

6 Claims, 5 Drawing Sheets

TWO DIMENSION/THREE DIMENSION SWITCHABLE LIQUID CRYSTAL LENS ASSEMBLY

BACKGROUND OF THE INVENTION

1. Field of the Invention

The present invention relates to a liquid crystal lens assembly, more particularly, to a two dimension/three dimension (2D/3D) switchable liquid crystal lens assembly having high lens power.

2. Description of the Related Art

Real-world images are perceived by the human eyes, and further, so-called three-dimensional (3D) images are perceived by the human brain depending on an apparent displacement of an object viewed along two different lines of sight. Such a displacement or a spatial difference is called parallax. A so-called 3D display device, simulating human vision to form different viewing angles, is capable of conveying 3D images to the viewer. The 3D display device produces two different 2D images with parallax, one for the viewer's right eye and the other for the left eye. Afterwards, the viewer's brain perceives these two different 2D images as a 3D image.

Nowadays, there are two types of 3D display devices in general, auto-stereoscopic displays and stereoscopic displays. A user of an auto-stereoscopic display can see 3D images without wearing special type glasses. As for a user of a stereoscopic display, he/she has to wear special type glasses to see 3D images. A commonly seen auto-stereoscopic display is divided into two types: parallax barrier auto-stereoscopic displays and lenticular lenses auto-stereoscopic displays. The theorem of parallax barrier auto-stereoscopic displays lies on that a user sees parallax images through both eyes by controlling light propagation direction with an opaque parallax barrier, and the parallax images is perceived as stereoscopic view in the brain.

As for lenticular lenses auto-stereoscopic displays, light propagation direction is controlled by varying the refractive index, which can be realized by different methods. One of them is to make a liquid crystal layer function as a physical lens. With the specially patterned indium tin oxide electrodes on top and bottom substrates, the unevenly distributed electric field lines are generated. The alignment of the liquid crystal molecules is thus changed to result in their different refractive indexes. Hence, the whole liquid crystal layer will behave like a lenticular lens to control the refraction direction of the incident light if a proper design is implemented.

Please refer to FIG. 1a and FIG. 1b, FIG. 1a is a schematic diagram showing a conventional GRIN lens without being applied with a voltage according to the prior art. FIG. 1b is a schematic diagram showing the conventional GRIN lens being applied with a voltage. The GRIN lens (gradient index lens) is characterized by its refractive index distribution that varies with the distance to the axis. When no voltage is applied on the GRID lens, liquid crystal molecules will align in a manner as shown in FIG. 1a. Owing to the existence of the above-mentioned indium tin oxide electrode pattern (not indicated), the liquid crystal molecules will align in another manner, as shown in FIG. 1b, when a voltage is applied on the GRIN lens. The electric field to be generated will cause the liquid crystal molecules at the center of the lens have the highest refractive index (ne), and decreases gradually from the center to both edges of the lens until the lowest refractive index (no). When light propagates into the GRIN lens, the light travels through both edges of the lens will have a highest speed because of the lowest refractive index of the liquid crystal molecules near the edges. While the light travels through the center of the lens will have a lowest speed because of the highest refractive index of the liquid crystal molecules near the center. For an incident plane wave, the wavefront is thus curved. The curved wavefront, similar to a convex lens, is what focus the light on a focus point F. The equation for focal length is derived as follows:

$$f_{GRIN} = \frac{r^2}{2d[n_{max} - n(r)]},$$

where '$f_{GRIN}$' is the focal length of the GRIN lens 10; "d" is the cell thickness; "r" is the radius of the GRIN lens 10; $n_{max}$ is the extraordinary refractive index $n_e$ of the liquid crystal molecules; "n(r)" means that refractive index is a function of r. When a design goal of 4 mm focal length is implanted, the cell thickness d must be maintained at approximately 30 µm if the refractive index difference Δn is 0.21. Therefore, in order to realize a small focal length, the only choice is to increase the cell thickness if the radius of the GRIN lens 10 cannot be reduced and the type of the liquid crystal molecules cannot be changed. However, the increased cell thickness not only increases the cell gap, but also increases the cost. It is therefore very important to provide a 2D/3D switchable liquid crystal lens assembly to improve the focus ability without increasing the cost resulted from the increased cell thickness.

SUMMARY OF THE INVENTION

The present invention provides a 2D/3D switchable liquid crystal lens assembly comprising an external set of fixed lenses to improve the lens power so as to resolve the problems of the prior art.

The present invention provides a liquid crystal lens assembly. The liquid crystal lens assembly from an emitting surface to an incident surface sequentially comprises a plurality of adjacently arranged elongated convex lenses, a first transparent substrate, a second transparent substrate, a plurality of electrodes disposed on the second transparent substrate, and a liquid crystal layer sandwiched between the first transparent substrate and the second transparent substrate. The plurality of electrodes are used for controlling an alignment of liquid crystal molecules inside the liquid crystal layer so as to adjust a refractive index of the liquid crystal molecules inside the liquid crystal layer corresponding to at least one pixel. The refractive index progressively increase or progressively decrease from a center of the liquid crystal layer corresponding to the pixel toward both sides to control a propagation direction of incident light and guide the passed incident light to one of the convex lenses.

In one aspect of the present invention, the electrode is an elongated electrode, the electrode extends along a direction parallel to an extending direction of the elongated convex lens.

In another aspect of the present invention, the liquid crystal lens assembly cooperates with linear polarized light, the plurality of elongated convex lenses extend along a first direction and arrange in a second direction perpendicular to the first direction, the polarized direction is parallel to the second direction.

In still another aspect of the present invention, the plurality of electrodes adjust the refractive index of the liquid crystal molecules inside the liquid crystal layer corresponding to the pixel to decrease from the center toward both of the sides to form 3D mode.

In yet another aspect of the present invention, the plurality of electrodes adjust the refractive index of the liquid crystal molecules inside the liquid crystal layer corresponding to the pixel to increase from the center toward both of the sides to form 2D mode.

The present invention provides another liquid crystal lens assembly. The liquid crystal lens assembly from an emitting surface to an incident surface sequentially comprises a first transparent substrate, a plurality of adjacently arranged elongated convex lenses, a second transparent substrate, a plurality of electrodes disposed on the second transparent substrate, and a liquid crystal layer sandwiched between the plurality of elongated convex lenses and the second transparent substrate. The plurality of electrodes are used for controlling an alignment of liquid crystal molecules inside the liquid crystal layer so as to adjust a refractive index of the liquid crystal molecules inside the liquid crystal layer corresponding to at least one pixel, the refractive index progressively increase or progressively decrease from a center of the liquid crystal layer corresponding to the pixel toward both sides to control a propagation direction of incident light and guide the passed incident light to one of the convex lenses.

In one aspect of the present invention, the electrode is an elongated electrode, the electrode extends along a direction parallel to an extending direction of the elongated convex lens.

In another aspect of the present invention, the liquid crystal lens assembly cooperates with linear polarized light, the plurality of elongated convex lenses extend along a first direction and arrange in a second direction perpendicular to the first direction, the polarized direction is parallel to the second direction.

In still another aspect of the present invention, the plurality of electrodes adjust the refractive index of the liquid crystal molecules inside the liquid crystal layer corresponding to the pixel to decrease from the center toward both of the sides to form 3D mode.

In yet another aspect of the present invention, the plurality of electrodes adjust the refractive index of the liquid crystal molecules inside the liquid crystal layer corresponding to the pixel to increase from the center toward both of the sides to form 2D mode.

In contrast to the prior art, with the support of a set of external lenses and the proper electrode design on the transparent substrate, the present invention only needs to apply predetermined voltages on the electrodes to make the liquid crystal layer function as a convex lens. The incident light, refracted by the convex lens of the liquid crystal layer and then refracted by the external lens, will be focused on the human eyes to form 3D images at the emitting surface. Since the incident light is refracted twice, the overall focus ability is improved. As a result, not only is the lens power improved, but also the cell gap is decreased. Furthermore, when switched to the 2D mode, only applying different voltages on the electrodes the location of the convex lens of the liquid crystal layer is shifted. The effect of the external lens is thus canceled out to allow 2D images to be formed at the emitting surface. The present invention liquid crystal lens assembly has the advantages of simple switching, decreased cell thickness, and reduced cost.

These and other features, aspects and advantages of the present disclosure will become understood with reference to the following description, appended claims and accompanying figures.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1A:
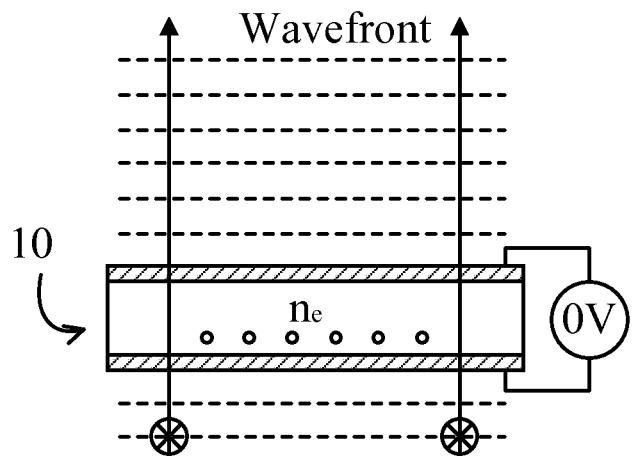
FIG. 1a is a schematic diagram showing a conventional GRIN lens without being applied with a voltage.
Figure 1B:
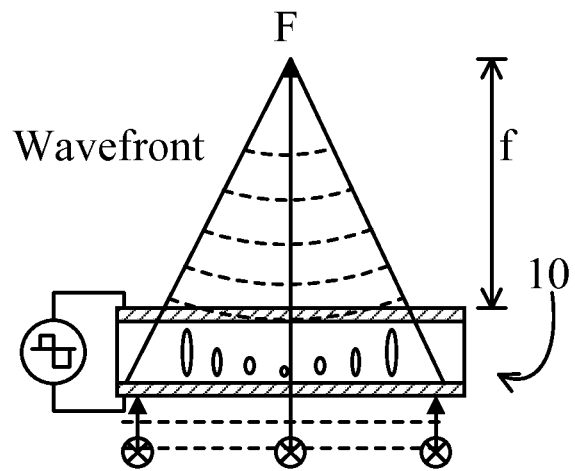
FIG. 1b is a schematic diagram showing the conventional GRIN lens being applied with a voltage.
Figure 2:
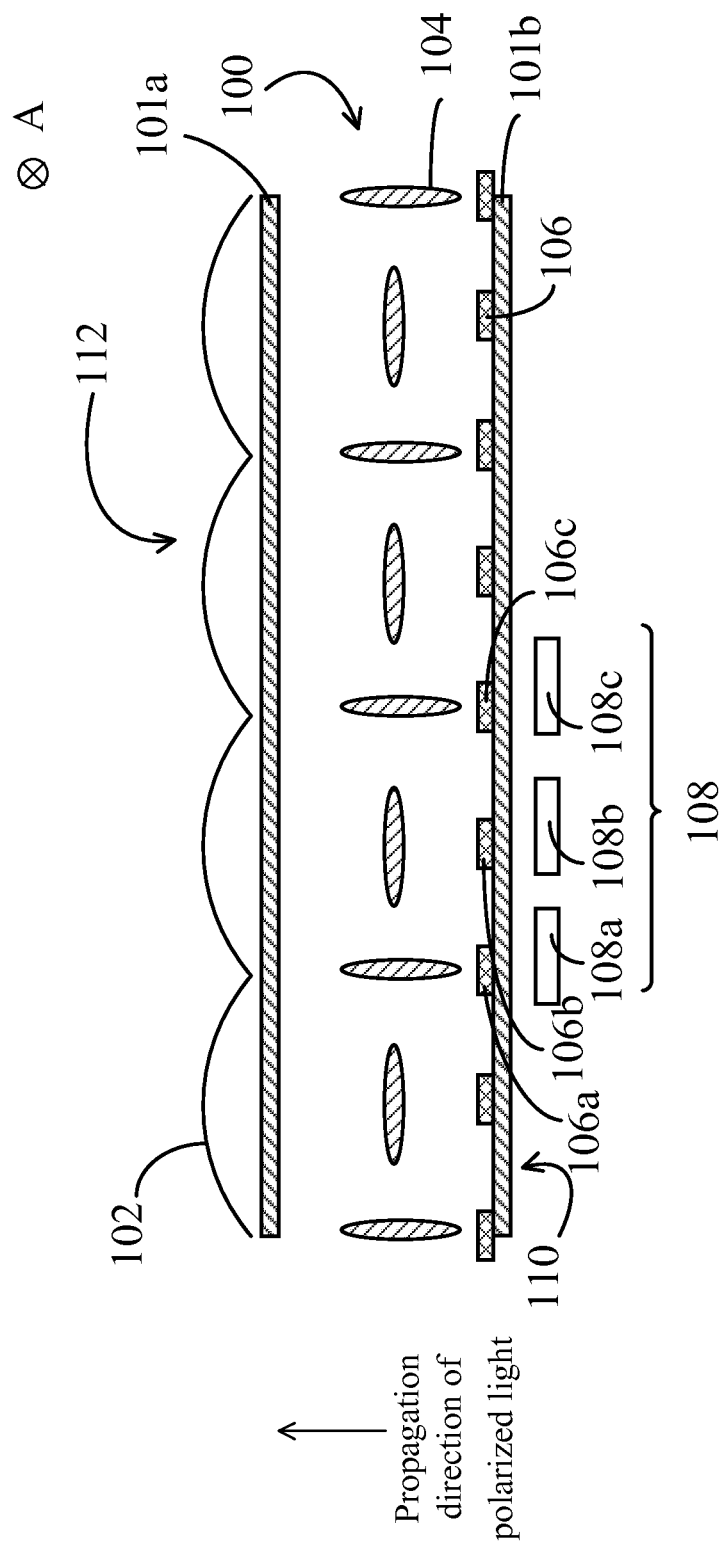
FIG. 2 is a cross-sectional view showing a present invention liquid crystal lens assembly and alignment of liquid crystal molecules in 3D mode according to a first embodiment of the present invention.

Please refer to FIG. 2, FIG. 2 is a cross-sectional view showing a present invention liquid crystal lens assembly and alignment of liquid crystal molecules in 3D mode according to a first embodiment of the present invention. As shown in FIG. 2, the liquid crystal lens assembly LCD 100 comprises a plurality of external lenses 102, a transparent substrate 101a, a liquid crystal layer 104, a transparent substrate 101b, and a plurality of electrodes 106 disposed on the transparent substrate 101b sequentially from a light emitting surface 112 to a light incident surface 110. The plurality of external lenses 102 and the plurality of electrodes 106 are elongated along a direction A perpendicular to the paper surface. In the present embodiment, electrode 106a, electrode 106b, and electrode 106c disposed respectively corresponding to subpixel 108a, subpixel 108b, and subpixel 108c are illustrated as an example. Polarized light is provided to the liquid crystal lens assembly 100 by a polarizer (not indicated) disposed between the liquid crystal lens assembly 100 and the subpixels 108a, 108b, 108c. The polarized light propagates along the direction indicated by an arrow shown in FIG. 2. The subpixel 108a, subpixel 108b, and subpixel 108c are a red subpixel, a green subpixel, and a blue subpixel, respectively. The subpixel 108a, subpixel 108b, and subpixel 108c constitute a pixel 108. In the present embodiment, the polarized direction of the polarized light emitted from the polarizer (not indicated) being perpendicular to the direction A and the light propagation direction is illustrated as an example. However, the present invention is not limited to this.

When voltages are applied on the electrodes 106a, 106b, 106c, the electric field as generated will make the liquid crystal molecules inside the liquid crystal layer 104 rotate. The liquid crystal molecules near the electrodes 106a, 106c will align so that their optical axes are parallel to the propagation direction of the polarized light, while the liquid crystal molecules near the electrode 106b will align so that their optical axes are parallel to the polarized direction of the incident light. Owing to the birefringence property of the liquid crystal molecules inside the liquid crystal layer 104, the liquid crystal molecules will have an ordinary refractive index $n_o$ when the polarized light incident onto the liquid crystal lens assembly 100 has a polarized direction perpendicular to the optical axes of the liquid crystal molecules, and the liquid crystal molecules will have an extraordinary refractive index $n_e$ when the polarized light incident onto the liquid crystal lens assembly 100 has a polarized direction in parallel with the optical axes of the liquid crystal molecules. The extraordinary refractive index is greater than the ordinary refractive index.

When light propagates, the light travelling in the vicinity of the electrodes 106a, 106c will have the highest speed because it encounters liquid crystal molecules having the lowest refractive index. Oppositely, the light travelling in the vicinity of the electrode 106b will have the lowest speed because it encounters liquid crystal molecules having the highest refractive index. By implementing a proper design, the different alignment of the liquid crystal molecules will result in the variation of the refractive index along the liquid crystal layer 104. Hence, the liquid crystal layer 104 corresponding to the pixel 108 will behave like a convex lens to control the refraction direction of the incident light.

After being refracted, the incident light propagates to the external lens 102. Because the external lens 102 is also a convex lens, the incident light is refracted again and is focused on the human eyes. Therefore, the viewer is allowed to see 3D images at the emitting surface 112. Since the incident light is refracted twice, the overall focus ability is improved. Hence, not only is the lens power improved, but also the cell gap is decreased.

Figure 3:
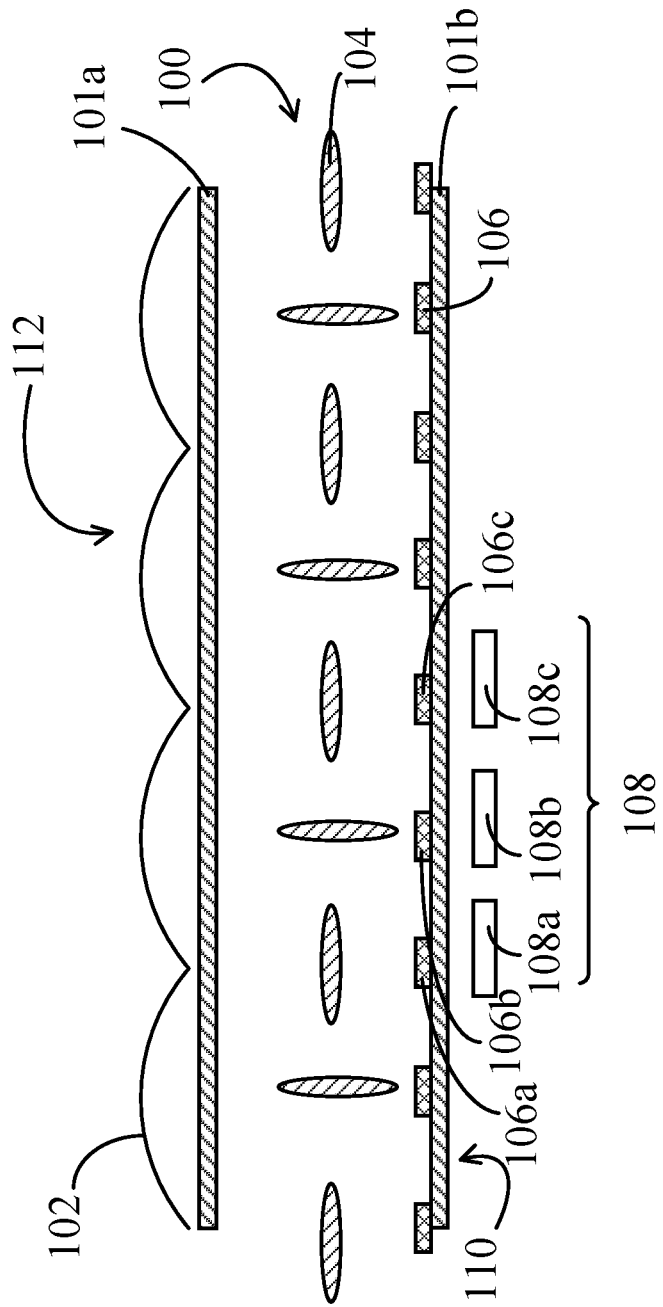
FIG. 3 is a cross-sectional view showing the liquid crystal lens assembly of FIG. 2 and alignment of liquid crystal molecules in 2D mode.

The liquid crystal lens assembly 100 is also adaptable to 2D mode. Please refer to FIG. 3, FIG. 3 is a cross-sectional view showing the liquid crystal lens assembly of FIG. 2 and alignment of liquid crystal molecules in 2D mode. In 2D mode, the voltages applied on the electrodes 106a, 106b, 106c are changed. The electric field as generated will make the liquid crystal molecules inside the liquid crystal layer 104 rotate. The liquid crystal molecules near the electrodes 106a, 106c will align so that their optical axes are parallel to the polarized direction of the incident light, while the liquid crystal molecules near the electrode 106b will align so that their optical axes are parallel to the propagation direction of the polarized light.

Due to the birefringence property of the liquid crystal molecules inside the liquid crystal layer 104, by implementing a proper design, the different alignment of the liquid crystal molecules will result in the variation of the refractive index along the liquid crystal layer 104. The liquid crystal layer 104 near the pixel 108 will thus behave like a convex lens, but however, the location of the convex lens is shifted when compared with that of the convex lens in 3D mode shown in FIG. 2 to cancel out the effect of the external lens 102. As a result, light travels along a straight line because there is no real effect of the lenses. The viewer is allowed to see 2D images at the emitting surface 112.

In the present invention, the 3D mode can be switched to the 2D mode by changing the voltages applied on the electrodes 106a, 106b, 106c, or voltages can be applied on an extra set of electrodes to shift the location of the convex lens of the liquid crystal layer 104. In this way, different set of electrodes is selected when switching to the 2D or 3D mode without the necessity of changing the voltages applied on the same set of electrodes.

In FIG. 2 and FIG. 3, the liquid crystal molecules inside the liquid crystal layer 104 are positive liquid crystal molecules whose optical axes are parallel to a direction of the electric field generated by applying voltages on the electrodes 106a, 106b, 106c. In another embodiment, the liquid crystal molecules inside the liquid crystal layer 104 are negative liquid crystal molecules. Under the circumstances, the alignment direction and the elongation direction of the electrodes need to be changed so as to achieve a proper design.

Figure 4:
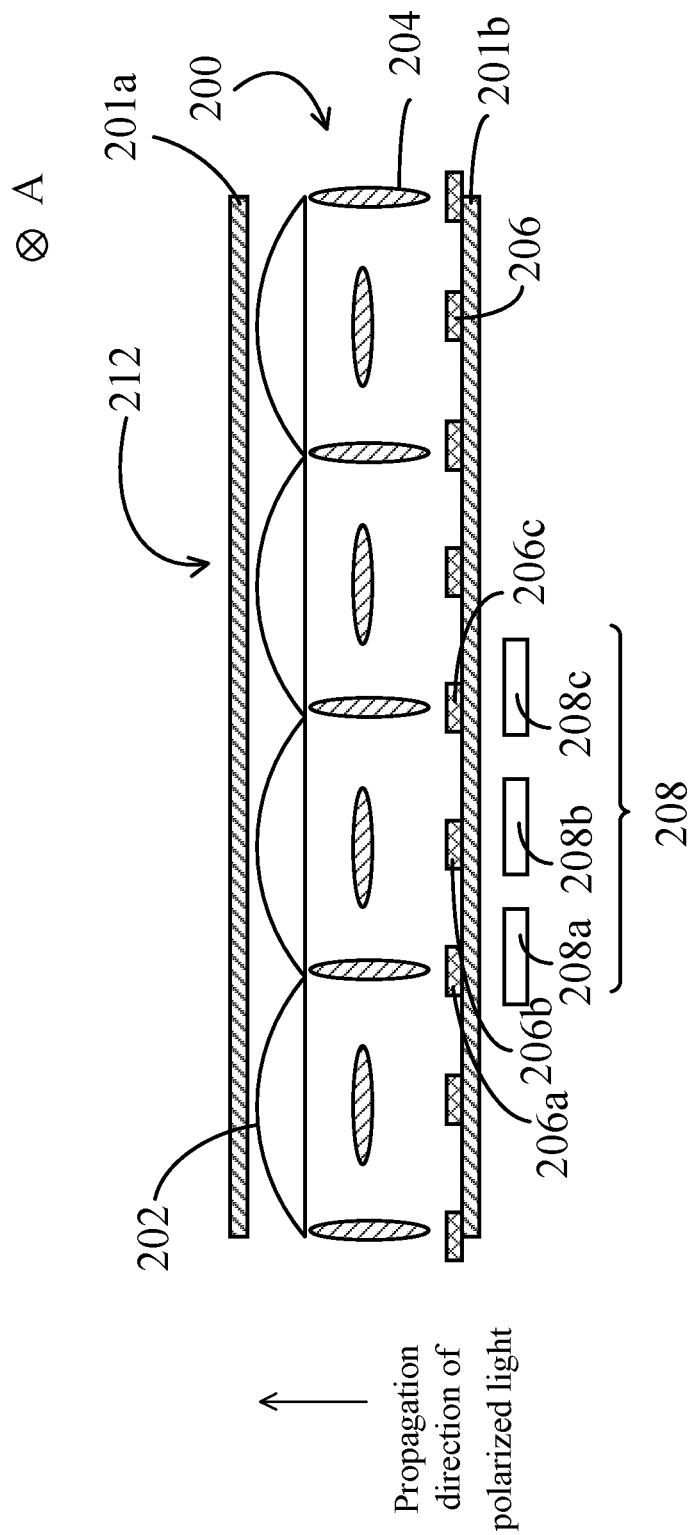
FIG. 4 is a cross-sectional view showing a present invention liquid crystal lens assembly and alignment of liquid crystal molecules in 3D mode according to a second embodiment of the present invention.

Please refer to FIG. 4, FIG. 4 is a cross-sectional view showing a present invention liquid crystal lens assembly and alignment of liquid crystal molecules in 3D mode according to a second embodiment of the present invention. The second embodiment differs from the first embodiment in that a plurality of external lenses 202 of a liquid crystal lens assembly 200 is disposed between a transparent substrate 201a and a transparent substrate 201b and adjacent to a liquid crystal layer 204. The plurality of external lenses 202 and a plurality of electrodes 206 are elongated along a direction A perpendicular to the paper surface. In the present embodiment, electrode 206a, electrode 206b, and electrode 206c disposed respectively corresponding to subpixel 208a, subpixel 208b, and subpixel 208c are illustrated as an example. Polarized light is provided to the liquid crystal lens assembly 200 by a polarizer (not indicated) disposed between the liquid crystal lens assembly 200 and the subpixels 208a, 208b, 208c. The polarized light propagates along the direction indicated by an arrow shown in FIG. 4. The subpixel 208a, subpixel 208b, and subpixel 208c are a red subpixel, a green subpixel, and a blue subpixel, respectively. The subpixel 208a, subpixel 208b, and subpixel 208c constitute a pixel 208. In the present embodiment, the polarized direction of the polarized light emitted from the polarizer (not indicated) being perpendicular to the direction A and the light propagation direction is illustrated as an example. However, the present invention is not limited to this.

When voltages are applied on the electrodes 206a, 206b, 206c, the electric field as generated will make the liquid crystal molecules inside the liquid crystal layer 204 rotate. The liquid crystal molecules near the electrodes 206a, 206c will align so that their optical axes are parallel to the propagation direction of the polarized light, while the liquid crystal molecules near the electrode 206b will align so that their optical axes are parallel to the polarized direction of the incident light. By implementing a proper design, the different alignment of the liquid crystal molecules will result in the variation of the refractive index along the liquid crystal layer 204. Hence, the liquid crystal layer 204 corresponding to the pixel 208 will behave like a convex lens to control the refraction direction of the incident light. The incident light is therefore refracted and then propagates to the external lens 202. Because the external lens 202 is also a convex lens, the incident light is refracted again and is focused on the human eyes. Therefore, the viewer is allowed to see 3D images at the emitting surface 212. Since the incident light is refracted twice, the overall focus ability is improved. Hence, not only is the lens power improved, but also the cell gap is decreased.

Figure 5:
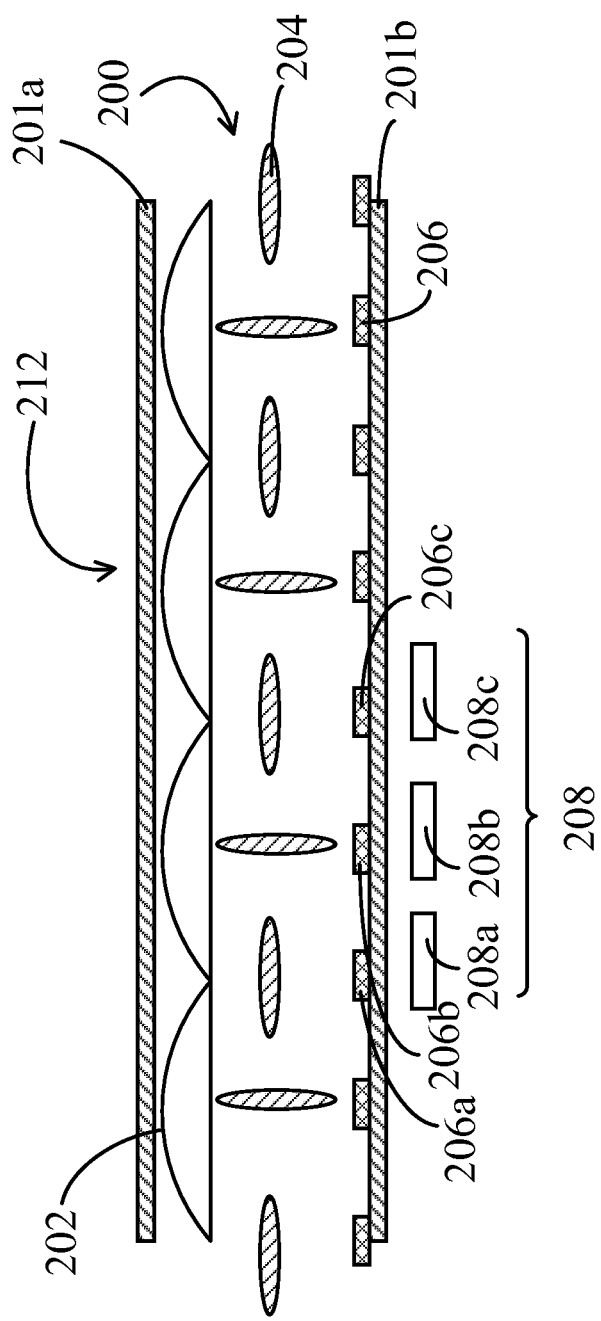
FIG. 5 is a cross-sectional view showing the liquid crystal lens assembly of FIG. 4 and alignment of liquid crystal molecules in 2D mode.

The liquid crystal lens assembly 200 is also adaptable to 2D mode. Please refer to FIG. 5, FIG. 5 is a cross-sectional view showing the liquid crystal lens assembly of FIG. 4 and alignment of liquid crystal molecules in 2D mode. In 2D mode, the voltages applied on the electrodes 206a, 206b, 206c are changed. The electric field as generated will make the liquid crystal molecules inside the liquid crystal layer 204 rotate. The liquid crystal molecules near the electrodes 206a, 206c will align so that their optical axes are parallel to the polarized direction of the incident light, while the liquid crystal molecules near the electrode 206b will align so that their optical axes are parallel to the propagation direction of the polarized light. Due to the birefringence property of the liquid crystal molecules inside the liquid crystal layer 204, by implementing a proper design, the different alignment of the liquid crystal molecules will result in the variation of the refractive index along the liquid crystal layer 204. The liquid crystal layer 204 near the pixel 208 will thus behave like a convex lens, but however, the location of the convex lens is shifted when compared with that of the convex lens in 3D mode shown in FIG. 4 to cancel out the effect of the external lens 202. As a result, light travels along a straight line because there is no real effect of the lenses. The viewer is allowed to see 2D images at the emitting surface 212.

Similarly, the 3D mode can be switched to the 2D mode by changing the voltages applied on the electrodes 206a, 206b, 206c, or voltages can be applied on an extra set of electrodes to shift the location of the convex lens of the liquid crystal layer 204. In FIG. 4 and FIG. 5, the liquid crystal molecules inside the liquid crystal layer 204 are positive liquid crystal molecules whose optical axes are parallel to a direction of the electric field generated by applying voltages on the electrodes 206a, 206b, 206c. In another embodiment, the liquid crystal molecules inside the liquid crystal layer 204 are negative liquid crystal molecules. Under the circumstances, the alignment direction and the elongation direction of the electrodes need to be changed so as to achieve a proper design.

In summary, with the support of a set of external lenses and the proper electrode design on the transparent substrate, the present invention only needs to apply predetermined voltages on the electrodes to make the liquid crystal layer function as a convex lens. The incident light, refracted by the convex lens of the liquid crystal layer and then refracted by the external lens, will be focused on the human eyes to form 3D images at the emitting surface. Since the incident light is refracted twice, the overall focus ability is improved. As a result, not only is the lens power improved, but also the cell gap is decreased. Furthermore, when switched to the 2D mode, only applying different voltages on the electrodes the location of the convex lens of the liquid crystal layer is shifted. The effect of the external lens is thus canceled out to allow 2D images to be formed at the emitting surface. The present invention liquid crystal lens assembly has the advantages of simple switching, decreased cell thickness, and reduced cost.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A liquid crystal lens assembly, from an emitting surface to an incident surface sequentially comprising:
   a plurality of adjacently arranged elongated convex lenses;
   a first transparent substrate;
   a second transparent substrate, and a plurality of electrodes disposed on the second transparent substrate; and
   a liquid crystal layer sandwiched between the first transparent substrate and the second transparent substrate;
   wherein the plurality of electrodes are used for controlling an alignment of liquid crystal molecules inside the liquid crystal layer so as to adjust a refractive index of the liquid crystal molecules inside the liquid crystal layer corresponding to at least one pixel, the plurality of electrodes comprise a first electrode, a second electrode, and a third electrode, the second electrode is adjacent to and positioned between the first electrode and the third electrode, and
   wherein optical axes of the liquid crystal molecules near the first and the third electrodes are parallel to a propagation direction of polarized light, while optical axes of the liquid crystal molecules near the second electrode are parallel to a polarized direction of incident light to form 3D mode, and optical axes of the liquid crystal molecules near the first and the third electrodes are parallel to the polarized direction of the incident light, while optical axes of the liquid crystal molecules near the second electrode are parallel to the propagation direction of the polarized light to form 2D mode.

2. The liquid crystal lens assembly as claimed in claim 1, wherein the electrode is an elongated electrode, the electrode extends along a direction parallel to an extending direction of the elongated convex lens.

3. The liquid crystal lens assembly as claimed in claim 2, wherein the liquid crystal lens assembly cooperates with linear polarized light, the plurality of elongated convex lenses extend along a first direction and arrange in a second direction perpendicular to the first direction, the polarized direction is parallel to the second direction.

4. A liquid crystal lens assembly, from an emitting surface to an incident surface sequentially comprising:
   a first transparent substrate;
   a plurality of adjacently arranged elongated convex lenses;
   a second transparent substrate, and a plurality of electrodes disposed on the second transparent substrate; and
   a liquid crystal layer sandwiched between the plurality of elongated convex lenses and the second transparent substrate;
   wherein the plurality of electrodes are used for controlling an alignment of liquid crystal molecules inside the liquid crystal layer so as to adjust a refractive index of the liquid crystal molecules inside the liquid crystal layer corresponding to at least one pixel, the plurality of electrodes comprise a first electrode, a second electrode, and a third electrode, the second electrode is adjacent to and positioned between the first electrode and the third electrode, and
   wherein optical axes of the liquid crystal molecules near the first and the third electrodes are parallel to a propagation direction of polarized light, while optical axes of the liquid crystal molecules near the second electrode are parallel to a polarized direction of incident light to form 3D mode, and optical axes of the liquid crystal molecules near the first and the third electrodes are parallel to the polarized direction of the incident light, while optical axes of the liquid crystal molecules near the second electrode are parallel to the propagation direction of the polarized light to form 2D mode.

5. The liquid crystal lens assembly as claimed in claim 4, wherein the electrode is an elongated electrode, the electrode extends along a direction parallel to an extending direction of the elongated convex lens.

6. The liquid crystal lens assembly as claimed in claim 5, wherein the liquid crystal lens assembly cooperates with linear polarized light, the plurality of elongated convex lenses extend along a first direction and arrange in a second direction perpendicular to the first direction, the polarized direction is parallel to the second direction.

* * * * *